UNITED STATES PATENT OFFICE.

WILLIAM H. BALL, OF BROOKLYN, NEW YORK.

IMPROVEMENT IN PREPARATIONS OF PEPSIN.

Specification forming part of Letters Patent No. 220,745, dated October 21, 1879; application filed May 20, 1879.

*To all whom it may concern:*

Be it known that I, WILLIAM H. BALL, of Brooklyn, in the county of Kings, in the State of New York, have invented a new and useful article of manufacture and condiment, suitable for sale and use as a table-diet, composed of pepsin and fine table-salt, of which the following is a specification.

The object of my invention is to make pepsin an article of diet by incorporating the pepsin with table-salt, and to produce a new article of manufacture and commodity of trade, capable of being packed, preserved, sold, and used in bottles, cruets, and other suitable vessels, at the same time to disguise or conceal, in ordinary use, the flavor or odor of the pepsin by its mixture with the salt.

Pepsin has become very generally known as a medicinal agent for promoting digestion, and for restoring and strengthening the digestive power of the human system when weakened or disordered, and its use is always innocent in its effects, if not absolutely beneficial. If, therefore, it can be introduced as an article of table-diet in such quantity and manner as not to exert any unpleasant effect as to taste or odor, its use and beneficial effects will be greatly enlarged and its value enhanced.

Pepsin and salt may be used together in equal portions, or in a variety of relative proportions, as is obvious. This is not what constitutes my invention. Merely putting the two ingredients together would not produce a compound which would be fit for a dietary article, nor to be put up and preserved as a commodity of trade, or as a new manufacture.

It is necessary that the two ingredients should be prepared by drying and grinding, and then mixed or incorporated in such relative proportions and conditions that the pepsin shall retain its medicinal virtues and the salt shall remain as a condiment and dietary article of food, without imbibing taste and odor of the pepsin, so as to injure the salt in its ordinary use as such condiment; and in this preparation and relative mixture, forming a dietary substance, and constituting a new article of manufacture and commodity capable of being put up and preserved in suitable bottles and vessels for sale or use, my invention consists.

In the manufacture and preparation of the pepsin from the stomachs of pigs or other animals I follow the usual formula or treatment of the stomachs by muriatic acid and salt and water, and I do not claim any part of such treatment as my invention.

In order to make pepsin a dietary article suitable as a table-condiment, and at the same time preserve its efficiency as a digestive agent, the proportion of pepsin to salt must be small. I have found that the ratio of one grain of pepsin to twenty-four grains of salt is as near an approximation as can be given by me to a general rule; but while taking this proportion as a guide, there must nevertheless be judgment and skill exercised in the making the mixture, inasmuch as the strength and active properties of pepsin will vary somewhat, according to its quality and the care with which it is made; but the right mixture of the pepsin and salt for the purposes aforesaid will be readily attained by the above proportions, due regard being had to the necessity of disguising and concealing the taste and odor of the pepsin, and leaving to the salt its usual flavor as a condiment.

Both the ingredients must be thoroughly dried and ground or reduced to a fine powder, and they must then be mixed and thoroughly incorporated with each other by sifting them together through a fine sieve, or other suitable manipulation, and then the mixture is in a condition to constitute a dietary article for table use, and also to be put up as an article of manufacture and trade, in bottles, cruets, jars, or any suitable packages.

In the compound prepared as above set forth the salt exerts some effect upon the pepsin thus thoroughly incorporated with it in preserving the pepsin from deterioration and in absorbing its odor and taste.

Having thus described my invention and the manner of making and using the same, what I claim, and desire to secure by Letters Patent, is—

The above-described compound of pepsin and salt, combining the properties of a condiment and a dietary medicine for table use, constituting a new manufacture and commodity of trade, capable of being put up and preserved in bottles, cruets, or any suitable vessels, for sale or use.

WILLIAM H. BALL.

Witnesses:
GEO. PFEIFFER,
D. B. BARNUM.